US 9,243,515 B2

(12) United States Patent
McAlice et al.

(10) Patent No.: US 9,243,515 B2
(45) Date of Patent: Jan. 26, 2016

(54) SUPPORT HANGER FOR FLEXIBLY CONNECTING A PLURALITY OF PANELS

(71) Applicant: United Technologies Corporation, Hartford, CT (US)

(72) Inventors: Timothy J. McAlice, Jupiter, FL (US); Carlos G. Figueroa, Wellington, FL (US)

(73) Assignee: United Technologies Corporation, Hartford, CT (US)

( * ) Notice: Subject to any disclaimer, the term of this patent is extended or adjusted under 35 U.S.C. 154(b) by 544 days.

(21) Appl. No.: 13/672,081

(22) Filed: Nov. 8, 2012

(65) Prior Publication Data
US 2014/0093369 A1 Apr. 3, 2014

Related U.S. Application Data

(60) Provisional application No. 61/707,017, filed on Sep. 28, 2012.

(51) Int. Cl.
| F01D 25/24 | (2006.01) |
| F01D 25/14 | (2006.01) |
| F01D 25/30 | (2006.01) |
| F02K 1/82 | (2006.01) |
| F23R 3/60 | (2006.01) |

(52) U.S. Cl.
CPC .............. *F01D 25/24* (2013.01); *F01D 25/14* (2013.01); *F01D 25/30* (2013.01); *F02K 1/822* (2013.01); *F23R 3/60* (2013.01); *Y02T 50/675* (2013.01)

(58) Field of Classification Search
CPC ....... F01D 25/14; F01D 25/246; F02K 1/822; F23R 3/60; F02C 7/20; F05D 2230/642; F23M 5/04
See application file for complete search history.

(56) References Cited

U.S. PATENT DOCUMENTS

| 3,164,389 | A | 1/1965 | Thomas |
| 4,506,648 | A | 3/1985 | Roberts |
| 4,696,431 | A | 9/1987 | Buxe |
| 4,903,476 | A | 2/1990 | Steber et al. |
| 4,944,151 | A | 7/1990 | Hovnanian |
| 5,059,055 | A | 10/1991 | DeGress et al. |
| 5,069,034 | A | 12/1991 | Jourdain et al. |
| 5,083,424 | A | 1/1992 | Becker |
| 5,101,624 | A | 4/1992 | Nash et al. |
| 5,103,639 | A | 4/1992 | Wolf |
| 5,329,763 | A | 7/1994 | Ibarreche Mendia et al. |
| 5,596,870 | A | 1/1997 | Dillard et al. |

(Continued)

FOREIGN PATENT DOCUMENTS

| EP | 0517561 | 10/1994 |
| EP | 0972905 | 1/2000 |
| GB | 715486 | 9/1954 |

OTHER PUBLICATIONS

EP search report for EP13841432.1 dated Sep. 25, 2015.

*Primary Examiner* — Dwayne J White
*Assistant Examiner* — Julian Getachew
(74) *Attorney, Agent, or Firm* — O'Shea Getz P.C.

(57) ABSTRACT

A turbine engine case includes a first panel, a second panel and a support hanger. The second panel defines an aperture. The support hanger includes a strut that is connected to the first panel, and a base that is pivotally connected to the strut. The base includes a pivot member that is pivotally engaged with the second panel. The base extends away from the strut and through the aperture to the pivot member.

20 Claims, 4 Drawing Sheets

(56) References Cited

U.S. PATENT DOCUMENTS

| | | |
|---|---|---|
| 5,704,208 A | 1/1998 | Brewer |
| 5,813,609 A | 9/1998 | Ellerhorst |
| 6,041,590 A | 3/2000 | Hayton et al. |
| 6,067,793 A | 5/2000 | Urruela et al. |
| 6,199,371 B1 | 3/2001 | Brewer et al. |
| 6,945,496 B2 | 9/2005 | Reniau |
| 7,017,334 B2 | 3/2006 | Mayer et al. |
| 7,721,522 B2 | 5/2010 | Farah et al. |
| 7,861,535 B2 * | 1/2011 | Figueroa et al. ............ 60/796 |
| 7,866,158 B2 | 1/2011 | Murphy |
| 2005/0155352 A1 | 7/2005 | Agg |
| 2005/0210864 A1 | 9/2005 | Lapergue et al. |
| 2006/0137324 A1 | 6/2006 | Farah |
| 2006/0179816 A1 | 8/2006 | Murphy et al. |
| 2007/0003411 A1 | 1/2007 | Manzoori |
| 2009/0077978 A1 | 3/2009 | Figueroa et al. |
| 2009/0293498 A1 | 12/2009 | Petty et al. |

* cited by examiner

SUPPORT HANGER FOR FLEXIBLY CONNECTING A PLURALITY OF PANELS

This application claims priority to U.S. Provisional Appln. No. 61/707,017 filed Sep. 28, 2012, which is hereby incorporated by reference.

BACKGROUND OF THE INVENTION

1. Technical Field

This disclosure relates generally to a turbine engine and, more particularly, to a support hanger for flexibly connecting, for example, an exhaust liner and an exhaust duct.

2. Background Information

A turbine engine may include a fan section, compressor section, a combustor section, a turbine section, an augmentor section and an exhaust section, which are sequentially arranged between an airflow inlet and an airflow exhaust. The exhaust section may include a tubular exhaust liner arranged within and connected to a tubular exhaust duct. An exhaust gas path extends axially through the exhaust section, adjacent to a radial inner side of the exhaust liner. An annular cooling gas path also extends axially through the exhaust section, between a radial outer side of the exhaust liner and a radial inner side of the exhaust duct.

Exhaust gas directed through the exhaust gas path may have a significantly higher temperature than that of cooling gas directed through the cooling gas path. These gases may also have different pressures. The exhaust liner and the exhaust duct therefore may be subject to different temperature and/or pressure gradients during turbine engine operation. These different temperature and pressure gradients may cause the exhaust liner and the exhaust duct to move (e.g., deflect, expand, contract or shift) relative to one another.

There is a need for a support hanger that connects a plurality of turbine engine panels together, while also accommodating movement therebetween.

SUMMARY OF THE DISCLOSURE

According to an aspect of the invention, a turbine engine case is provided that includes a first panel, a second panel and a support hanger. The second panel defines an aperture. The support hanger includes a strut that is connected to the first panel, and a base that is pivotally connected to the strut. The base includes a pivot member that is pivotally engaged with the second panel. The base extends away from the strut and through the aperture to the pivot member.

According to another aspect of the invention, another turbine engine case is provided that includes a first panel, a second panel and a support hanger. The second panel defines an aperture. The support hanger includes a strut that is connected to the first panel, and a base that is pivotally mounted to the second panel. The strut includes a parti-spherical head. The base defines a bore that receives the parti-spherical head. The base is clamped onto and is pivotally engaged with the parti-spherical head.

The second panel may define an aperture. The base may include a pivot member that is pivotally engaged with the second panel. The base may extend away from the strut and through the aperture to the pivot member.

The second panel may include a first bearing surface that has an arcuate cross-sectional geometry and extends circumferentially around the aperture. The pivot member may include a second bearing surface that has an arcuate cross-sectional geometry and slidably engages the first bearing surface. The first bearing surface may be concave. The second bearing surface may be convex.

The base may include a retainer and a collar. The retainer defines a retainer bore, and includes the pivot member which extends circumferentially around an axis of the retainer bore. In one embodiment, the collar extends into the retainer bore and is pivotally connected to the strut. In another embodiment, collar defines the collar bore. The collar extends into the retainer bore, and is clamped onto and pivotally engaged with the parti-spherical head.

The collar may be threaded into the retainer.

The strut may include a first parti-spherical surface. The collar may include a second parti-spherical surface that slidably engages the first parti-spherical surface. The second parti-spherical surface may at least partially define a collar bore that extends into the collar.

The collar may include a parti-spherical surface that engages the parti-spherical head, and at least partially defines the collar bore.

The first parti-spherical surface may be convex. The second parti-spherical surface may be concave.

A slot may extend radially through and axially into a sidewall of the collar. The slot may also extend axially through the second parti-spherical surface.

The retainer may include a lock member that extends circumferentially around the collar and axially overlaps at least a portion of the strut. The retainer bore may be at least partially defined by the lock member.

The pivot member may extend circumferentially around the collar.

The retainer may include a plurality of torquing features. The collar may include an anti-rotation feature.

A (e.g., annular) seal may be arranged between the second panel and the pivot member.

The foregoing features and the operation of the invention will become more apparent in light of the following description and the accompanying drawings.

DETAILED DESCRIPTION OF THE INVENTION

Figure 1:
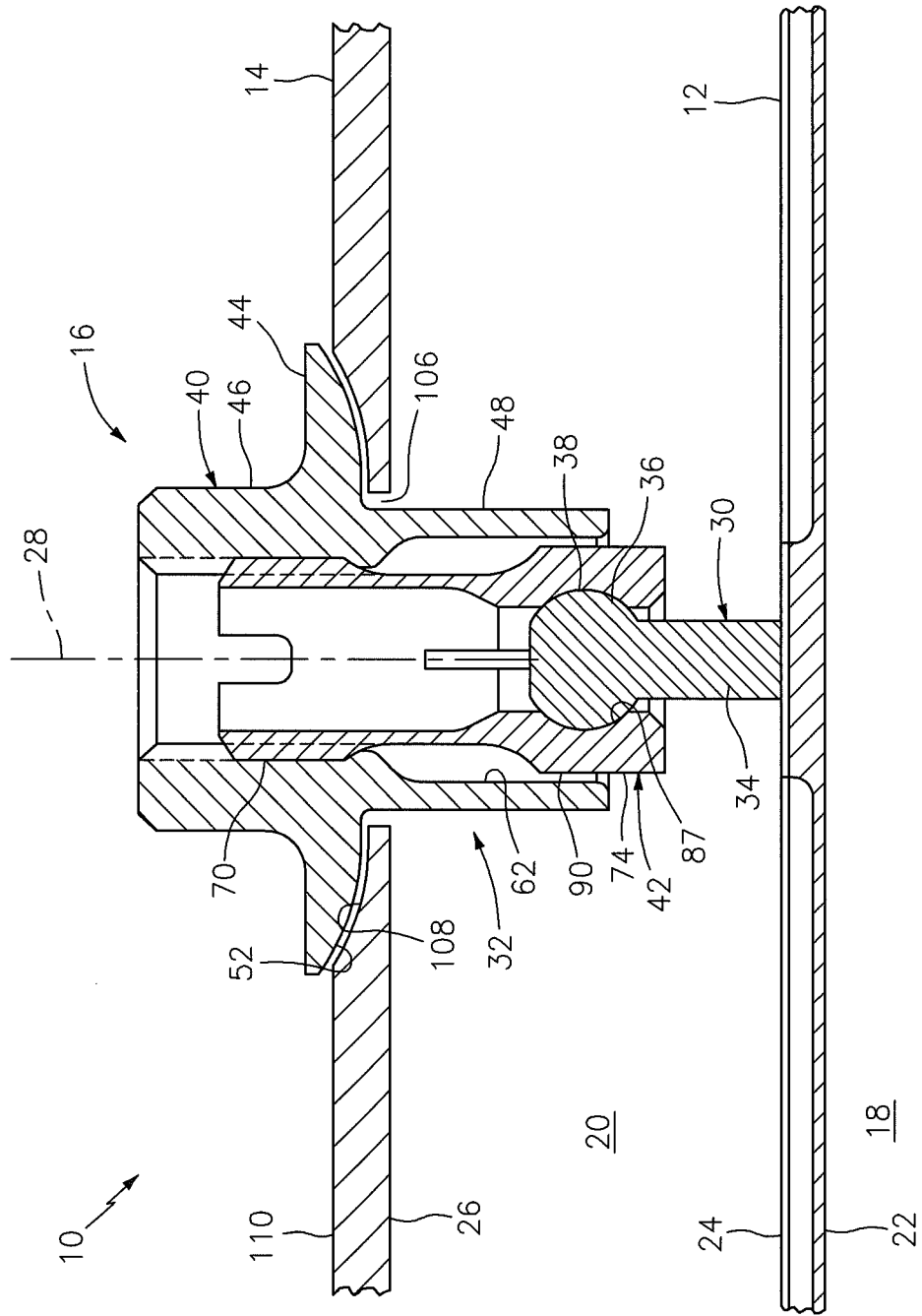
FIG. 1 is a sectional illustration of a support hanger that flexibly connects a first panel to a second panel.

A turbine engine may include a fan section, a compressor section, a combustor section, a turbine section, an augmentor section and an exhaust section. One or more of these engine sections may include a multi-panel turbine engine case. FIG. 1 illustrates, for example, a sectional view of a turbine engine case 10 for an exhaust section that includes a first panel 12 and a second panel 14, which are flexibly connected together with one or more support hangers 16.

The first panel 12 is a tubular dual wall exhaust liner. The second panel 14 is a tubular exhaust duct. The first panel 12 is arranged (e.g., concentrically) within the second panel 14, thereby defining a first (e.g., exhaust) gas path 18 and an annular second (e.g., cooling) gas path 20. The first gas path 18 extends through the exhaust section along a radial inner side 22 of the first panel 12. The second gas path 20 extends at least partially through the exhaust section between a radial outer side 24 of the first panel 12 and a radial inner side 26 of the second panel 14.

Each of the support hangers 16 may have an axial centerline 28, and include a strut 30 (e.g., a pin) and a base 32. The strut 30 includes a shaft 34 that extends axially to a parti-spherical head 36. The head 36 has a convex parti-spherical surface 38 that extends circumferentially around the centerline 28.

Figure 2:
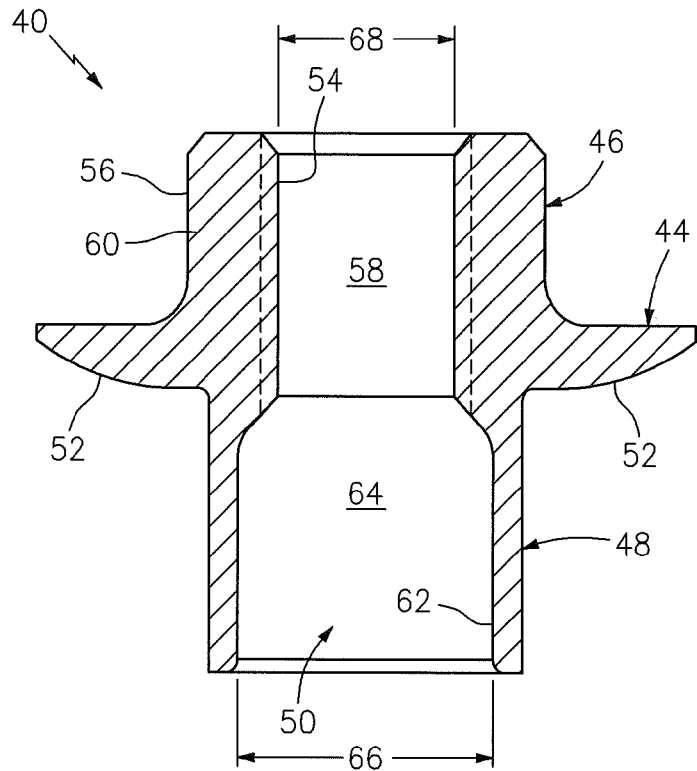
FIG. 2 is a sectional illustration of a retainer included in the support hanger of FIG. 1.
Figure 3:
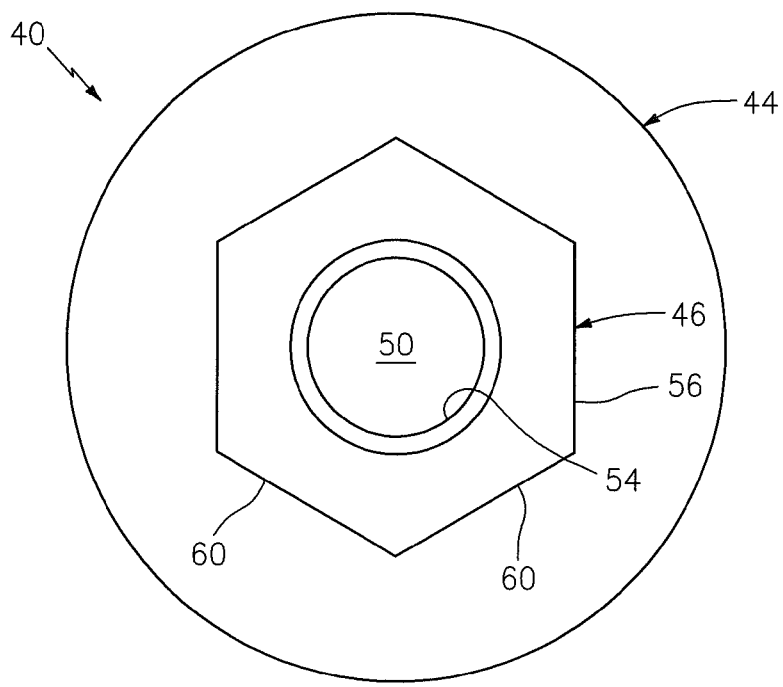
FIG. 3 is an illustration of an end of the retainer of FIG. 2.

The base 32 may include a retainer 40 and a collar 42. Referring to FIGS. 2 and 3, the retainer 40 includes a pivot member 44, a connector member 46, a lock member 48 and a retainer bore 50. The pivot member 44 is an annular flange with a bearing surface 52 that extends circumferentially around the connector member 46. The bearing surface 52 also extends radially out from the lock member 48. The bearing surface 52 has a convex arcuate cross-sectional geometry. The connector member 46 extends axially to the lock member 48. The connector member 46 extends radially between a threaded inner surface 54 and an outer surface 56. The surface 54 defines a first portion 58 of the retainer bore 50 that extends axially through the connector member 46. The surface 56 defines a plurality of torquing features 60 (e.g., flats), which may be arranged in a hexagonal bolt head configuration. The lock member 48 has a radial inner surface 62 that defines a second portion 64 of the retainer bore 50. The surface 62 has a diameter 66 that is greater than a diameter 68 of the surface 54. The second portion 64 of the retainer bore 50 extends axially from the first portion 58 through the lock member 48.

Figure 6:
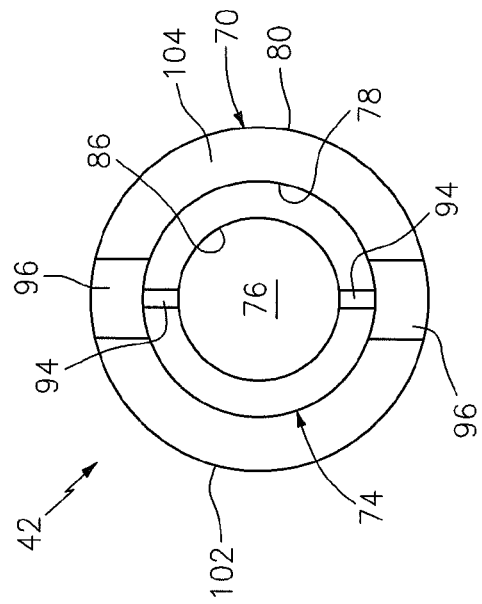
FIG. 6 is an illustration of an opposite end of the collar of FIG. 4.
Figure 5:
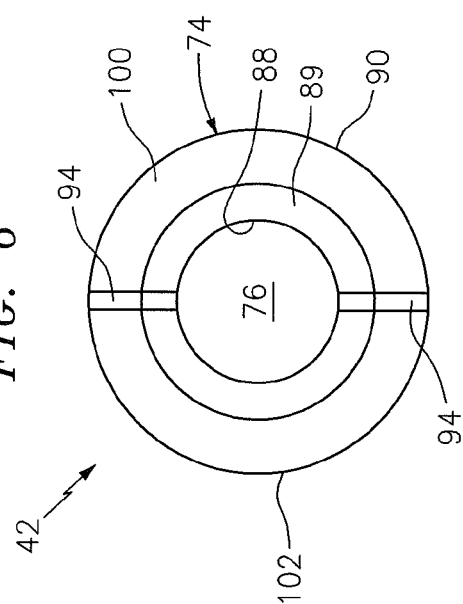
FIG. 5 is an illustration of an end of the collar of FIG. 4.
Figure 4:
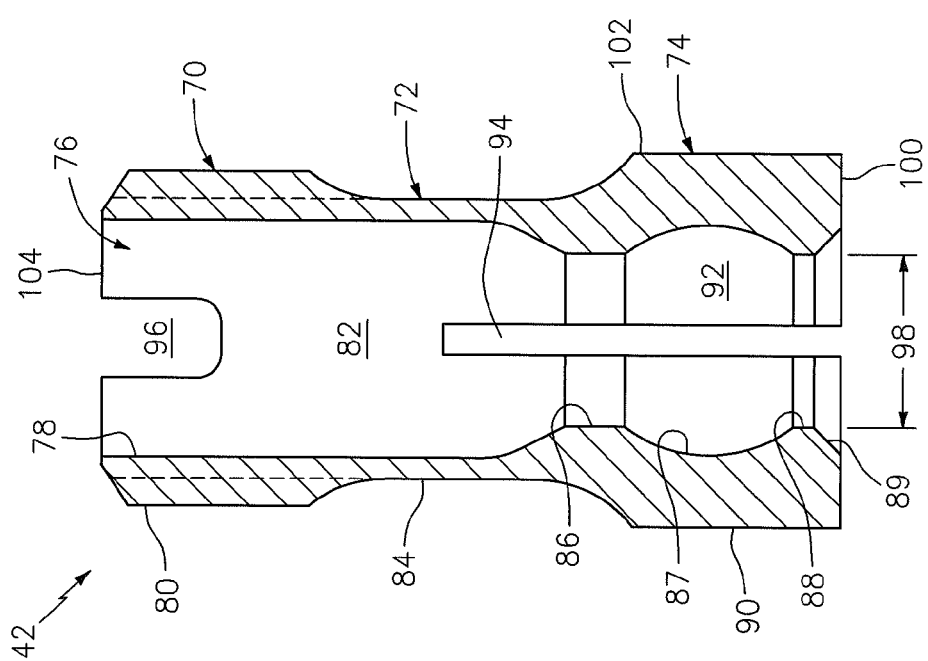
FIG. 4 is a sectional illustration of a collar included in the support hanger of FIG. 1.

Referring to FIGS. 4 to 6, the collar 42 includes a connector member 70, an intermediate member 72, a clamp member 74 and a collar bore 76. The connector member 70 extends radially between an inner surface 78 and a threaded outer surface 80. The surface 78 defines a first portion 82 of the collar bore 76 that extends axially through the connector member 70 and the intermediate member 72. The intermediate member 72 extends axially between the connector member 70 and the clamp member 74. The intermediate member 72 extends radially between the surface 78 and an outer surface 84. The clamp member 74 extends radially between one or more inner surfaces 86-89 and an outer surface 90. The inner surfaces 86-89 define a second portion 92 of the collar bore 76 that extends axially through the clamp member 74. The surface 87 is a concave parti-spherical surface.

The collar 42 may define one or more relief (e.g., collar expansion) slots 94 and/or an anti-rotation feature 96. The slots 94 are arranged circumferentially around the centerline. The slots 94 are configured to permit a diameter 98 of the surface 88 at (e.g., proximate or adjacent) an end 100 of the collar 42 to temporarily increase during support hanger 16 assembly. One or more of the slots 94 extend radially through a sidewall 102 of the collar 42. One or more of the slots 94 also extend axially into the sidewall 102; e.g., through the clamp member 74 and the surfaces 86-89 and into the intermediate member 72. The anti-rotation feature 96 may be configured as one or more slots that extend from an end 104 of the collar 42 into the connector member 70.

Referring to FIG. 1, the shaft 34 may be rigidly connected to the first panel 12 on its outer side 24. The clamp member 74 is clamped onto the head 36. The surface 87 is slidably engaged with (e.g., contacts) the surface 38, which pivotally connects the collar 42 to the strut 30. The retainer 40 extends through an aperture 106 (e.g., a hole, slot or channel) defined by the second panel 14, which aperture 106 is circumscribed by a bearing surface 108 with a concave arcuate cross-sectional geometry. The connector member 70 is mated with (e.g., threaded into) the connector member 46, which rigidly connects the retainer 40 to the collar 42. The pivot member 44 is seated against a radial outer side 110 of the second panel 14. The bearing surface 52 is slidably engaged with the bearing surface 108, which pivotally mounts the retainer 40 to the second panel 14. The lock member 48 axially overlaps at least a portion of the clamp member 74 and/or the head 36, which may prevent the clamp member 74 from disconnecting from the head 36. For example, the surface 62 may engage and prevent the surface 90 from moving radially outwards, which may prevent the diameter 98 illustrated in FIG. 4 from increasing.

Figure 7:
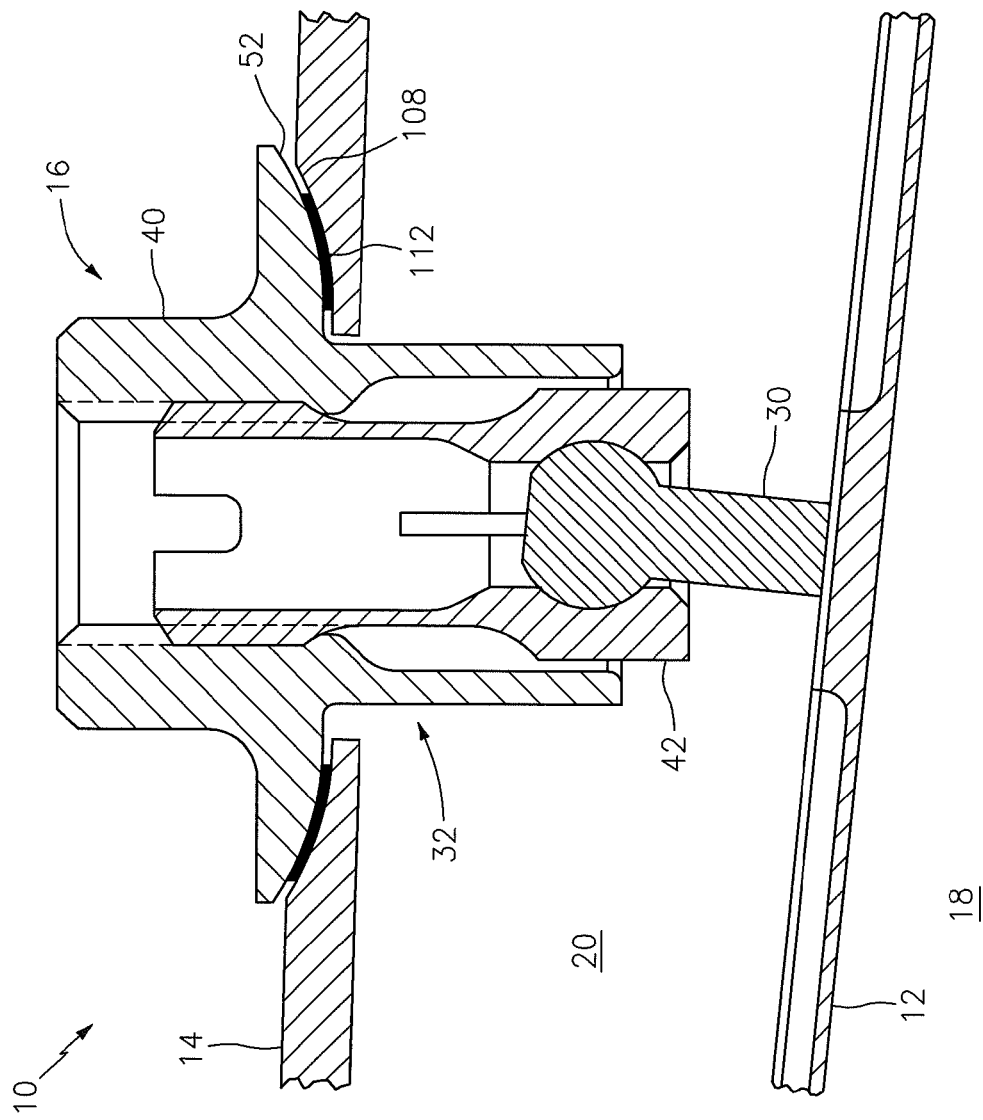
FIG. 7 is a sectional illustration of another support hanger that flexibly connects a first panel to a second panel.

Referring again to FIG. 1, exhaust gas directed through the first gas path 18 may have a significantly higher temperature than that of cooling gas directed through the second gas path 20. These gases within the first and the second gas paths 18 and 20 may also have different pressures. The first and the second panels 12 and 14 therefore may be subject to different temperature and/or pressure gradients during turbine engine operation. These different temperature and pressure gradients may cause the first and the second panels 12 and 14 to move (e.g., deflect, expand, contract or shift) relative to one another as illustrated in FIG. 7. Each support hanger 16 may accommodate such movement by way of the pivoting connection between the collar 42 and the strut 30 and/or the pivoting engagement between the retainer 40 and the second panel 14.

In some embodiments, one or more of the support hangers 16 may also include an annular seal 112 as illustrated in FIG. 7. The annular seal 112 is arranged between the bearing surface 52 and the bearing surface 108, and may reduce fluid leakage therebetween.

The term "pivot" may describe a two-dimensional tilting movement between the collar 42 and the strut 30 and/or between the retainer 40 and the second panel 14. The term "pivot" may also or alternatively describe a three-dimensional swiveling movement between the collar 42 and the strut 30 and/or between the retainer 40 and the second panel 14.

A person of skill in the art will recognize the support hangers may have alternate quantities and/or configurations of torquing features, anti-rotation features and/or relief slots than those described above and illustrated in the drawings. The torquing features, for example, may alternatively be configured within the retainer bore. The present invention therefore is not limited to any particular torquing feature, anti-rotation feature and/or relief slot quantities and/or configurations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:
1. A turbine engine case, comprising:
a first panel;
a second panel defining an aperture; and a support hanger including a strut that is connected to the first panel, and a base that is pivotally connected to the strut, the base including a pivot member;
wherein the pivot member is an annular flange extending circumferentially around an axial centerline, and the pivot member is pivotally engaged with and positioned axially adjacent to the second panel; and
wherein the base extends away from the strut and through the aperture to the pivot member.

2. The turbine engine case of claim 1, wherein
the second panel includes a first bearing surface that has an arcuate cross-sectional geometry and extends circumferentially around the aperture; and
the pivot member includes a second bearing surface that has an arcuate cross-sectional geometry and slidably engages the first bearing surface.

3. The turbine engine case of claim 2, wherein the first bearing surface is concave and the second bearing surface is convex.

4. The turbine engine case of claim 1, further comprising a seal arranged between the second panel and the pivot member.

5. A turbine engine case, comprising:
a first panel;
a second panel defining an aperture; and
a support hanger including a strut that is connected to the first panel, and a base that is pivotally connected to the strut the base including a pivot member that is pivotally engaged with the second panel, wherein the base extends away from the strut and through the aperture to the pivot member;
wherein the base includes a retainer and a collar;
wherein the retainer defines a retainer bore, and includes the pivot member which extends circumferentially around an axis of the retainer bore; and
wherein the collar extends into the retainer bore and is pivotally connected to the strut.

6. The turbine engine case of claim 5, wherein the collar is threaded into the retainer.

7. The turbine engine case of claim 5, wherein
the strut includes a first parti-spherical surface;
the collar includes a second parti-spherical surface that slidably engages the first parti-spherical surface; and
the second parti-spherical surface at least partially defines a collar bore that extends into the collar.

8. The turbine engine case of claim 7, wherein the first parti-spherical surface is convex and the second parti-spherical surface is concave.

9. The turbine engine case of claim 7, wherein a slot extends radially through and axially into a sidewall of the collar, and the slot extends axially through the second parti-spherical surface.

10. The turbine engine case of claim 7, wherein
the retainer includes a lock member that extends circumferentially around the collar and axially overlaps at least a portion of the strut; and
the retainer bore is at least partially defined by the lock member.

11. The turbine engine case of claim 5, wherein the pivot member extends circumferentially around the collar.

12. The turbine engine case of claim 5, wherein the retainer includes a plurality of torquing features, and the collar includes an anti-rotation feature.

13. A turbine engine case, comprising:
a first panel;
a second panel; and
a support hanger including a strut that is connected to the first panel, and a base that is pivotally mounted to the second panel, the strut including a parti-spherical head, and the base defining a bore that receives the parti-spherical head, wherein the base is clamped onto and is pivotally engaged with the parti-spherical head; and
wherein the strut further includes a shaft extending longitudinally along a centerline away from the first panel to the parti-spherical head.

14. The turbine engine case of claim 13, wherein
the second panel defines an aperture;
the base includes a pivot member that is pivotally engaged with the second panel; and
the base extends away from the strut and through the aperture to the pivot member.

15. The turbine engine case of claim 14, wherein
the second panel includes a first bearing surface that has an arcuate cross-sectional geometry and extends circumferentially around the aperture; and
the pivot member includes a second bearing surface that has an arcuate cross-sectional geometry and slidably engages the first bearing surface.

16. A turbine engine case, comprising:
a first panel;
a second panel; and
a support hanger including a strut that is connected to the first panel, and a base that is pivotally mounted to the second panel the strut including a parti-spherical head, and the base defining a bore that receives the parti-spherical head, wherein the base is clamped onto and is pivotally engaged with the parti-spherical head;
wherein the base includes a retainer and a collar;
wherein the retainer defines a retainer bore, and includes the pivot member which extends circumferentially around an axis of the retainer bore; and
wherein the collar defines the bore, the collar extends into the retainer bore, and the collar is clamped onto and is pivotally engaged with the parti-spherical head.

17. The turbine engine case of claim 16, wherein the collar is threaded into the retainer.

18. The turbine engine case of claim 16, wherein
the collar includes a parti-spherical surface that engages the parti-spherical head, and at least partially defines the bore.

19. The turbine engine case of claim 18, wherein a slot extends radially through and axially into a sidewall of the collar, and the slot extends axially through the parti-spherical surface.

20. The turbine engine case of claim 18, wherein
the retainer includes a lock member that extends circumferentially around the collar and axially overlaps at least a portion of the strut; and
the retainer bore is at least partially defined by the lock member.

* * * * *